United States Patent [19]

Bey

[11] Patent Number: 5,480,123
[45] Date of Patent: Jan. 2, 1996

[54] BUTTERFLY TYPE CONTROL VALVE

[75] Inventor: Roger Bey, Illzach, France

[73] Assignee: Rotatrol AG, Cham, Switzerland

[21] Appl. No.: 346,286

[22] Filed: Nov. 23, 1994

[30] Foreign Application Priority Data

Nov. 24, 1993 [FR] France .................................. 93 14219

[51] Int. Cl.⁶ ....................................................... F16K 1/22
[52] U.S. Cl. ............................................ 251/305; 251/127
[58] Field of Search ...................................... 251/127, 305; 137/625.3

[56] References Cited

U.S. PATENT DOCUMENTS

| | | | |
|---|---|---|---|
| 2,010,694 | 8/1935 | Jones | 251/305 X |
| 3,234,966 | 2/1966 | Klose. | |
| 3,238,955 | 3/1966 | Lassiter, Jr. | 251/305 X |
| 4,271,866 | 6/1981 | Bey | 251/127 X |

FOREIGN PATENT DOCUMENTS

| | | |
|---|---|---|
| 0188130 | 7/1986 | European Pat. Off. . |
| 0471439A3 | 2/1993 | European Pat. Off. . |
| 2616874 | 12/1988 | France . |
| 2728697B2 | 1/1979 | Germany . |
| 4143309A1 | 10/1992 | Germany . |

Primary Examiner—John C. Fox
Attorney, Agent, or Firm—Oblon, Spivak, McClelland, Maier & Neustadt

[57] ABSTRACT

The present invention relates to a butterfly type control valve.

This valve (30) comprises a body (31) defining a housing (32) for a mobile plug (13), rotating about an axis (14). The housing (32) is extended by an inlet channel (15) and an outlet channel (16), thus defining a connection passage between the inlet channel and the outlet channel. The effective cross section of this passage and therefore the flow rate of the fluid flowing through the valve are controlled according to the angular position of the plug (13). Furthermore, this valve comprises an element which generates a drop in pressure (18) provided with several calibrated passages (19) with a small diameter, located between the inlet channel (15) and a part of the housing, in a peripheral area of said housing (32).

The valve makes it possible to reduce cavitation, noise and wear and tear of the valve by creating a considerable drop in pressure when the valve is slightly open, whilst allowing a greater control range.

15 Claims, 5 Drawing Sheets

BUTTERFLY TYPE CONTROL VALVE

BACKGROUND OF THE INVENTION

1. Field of the Invention

The present invention relates to butterfly type control valve, comprising a body in which is provided a housing containing a mobile plug called a butterfly, this plug rotating about an axis; said housing being extended on either side by an inlet channel and by an outlet channel which are respectively arranged to be connected to an inlet conduit and an outlet conduit, said inlet channel, said housing and said outlet channel defining a connection passage linking the inlet conduit to the outlet conduit, the effective cross section of this passage and therefore the flow rate of the fluid flowing through the valve being controlled according to the angular position of the plug in the housing.

2. Discussion of Background

The butterfly valves which are currently used for fluid control purposes, comprise a body in which is provided a housing containing a plug which rotates about a central axis. This housing is extended on one side by an inlet channel and on the other side by an outlet channel, arranged respectively to be connected to an inlet conduit and to an outlet conduit (not shown). When the plug rotates about its axis of rotation, the size of the passage connecting the inlet channel to the outlet channel through the valve's housing is increased or reduced. Thus by rotating this plug, the flow of the fluid flowing through the valve can be controlled.

This type of valve unfortunately presents a number of drawbacks. When the opening starts, the fact that the passage between the inlet channel and the outlet channel is small means that the fluid flowing through the valve does so at high speed. The position of the mobile plug is then unstable which makes good control difficult.

Furthermore, the static pressure on the mobile plug is not symmetric in relation to its axis of rotation. The result is a torque which tends to make it rotate about its axis which makes fluid control erratic.

Lastly, the dynamic torque on the mobile plug depends on the opening angle and the differential pressure, which also leads to unstable control.

An answer to some of these problems was provided by a butterfly valve which comprises a back pressure baffle placed in its housing, in the vicinity of the outlet channel. This baffle reduces the dynamic torque which makes it easier to rotate the plug and to keep it in position.

This valve does still however present some drawbacks. The back pressure baffle is only efficient for a given flow rate and is not able to overcome the above-mentioned problems which are posed when the valve starts to open. It does not make it possible either to ensure a stable control of the flow rate when slightly open.

Other solutions, such as those illustrated in the French publication FR-A-2 616 874 and the European publication EP-A- 0 188 130, have been provided by fitting an element which generates a drop in pressure located in the valve's opening and closing zones. In the first publication, this element comes in the form of perforated circular sector the center of which is that of the plug's axis. In the second publication, the element generating a drop in pressure is made up of one or several perforated plates arranged parallel to one another. In these two forms, when the plug is opened slightly, the flow of fluid runs on both opposite sides of the plug, which prevents the flow rate from being precisely controlled when it is low.

SUMMARY OF THE INVENTION

The present invention proposes to overcome these drawbacks by providing a butterfly valve which makes it possible to ensure precise control of a low flow rate, offering a more or less symmetrical pressure in relation to the plug's axis of rotation and presenting a high drop in pressure at the valve inlet so that the phenomena of cavitation and noise are not created.

This object is achieved by a valve as described in the introduction, and characterised in that it comprises at least one element which generates a drop in pressure located in at least one peripheral area of the inlet channel, said element comprising at least one calibrated passage linking the inlet channel to said housing and in that said housing has an intermediate closing zone which is diametrical to the element which generates a drop in pressure and arranged to cooperate with said mobile plug in order to make sure this part of the valve closes so that the fluid flowing through the valve can only enter the housing by the element which generates a drop in pressure.

In a first embodiment of the invention, the element which generates a drop in pressure has several calibrated passages linking the inlet channel to the housing containing the mobile plug.

In a second embodiment, the element which generates a drop in pressure has several longitudinal grooves linking the inlet channel to the housing containing the mobile plug.

In a third embodiment, the element which generates a drop in pressure has several undulated slots linking the inlet channel to the housing containing the mobile plug.

The present invention and its advantages will be more fully disclosed in the detailed description of various embodiments given as unrestricted examples and illustrated by the attached drawings, in which:

DESCRIPTION OF THE PREFERRED EMBODIMENTS

Figure 1:
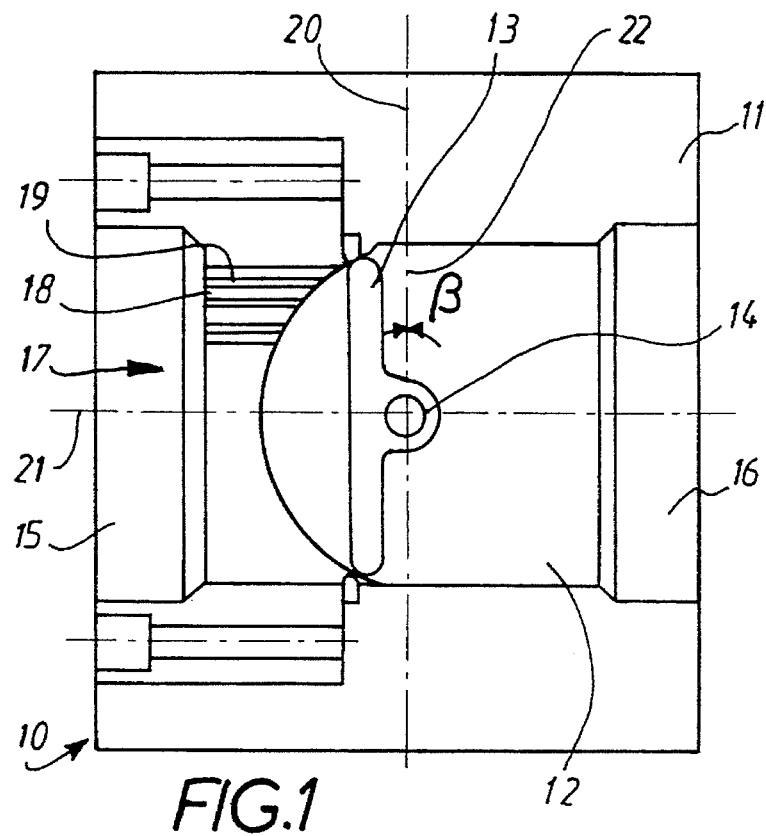
FIG. 1 is a cutaway view of a first embodiment of a valve according to the invention, in the closed position.
Figure 2:
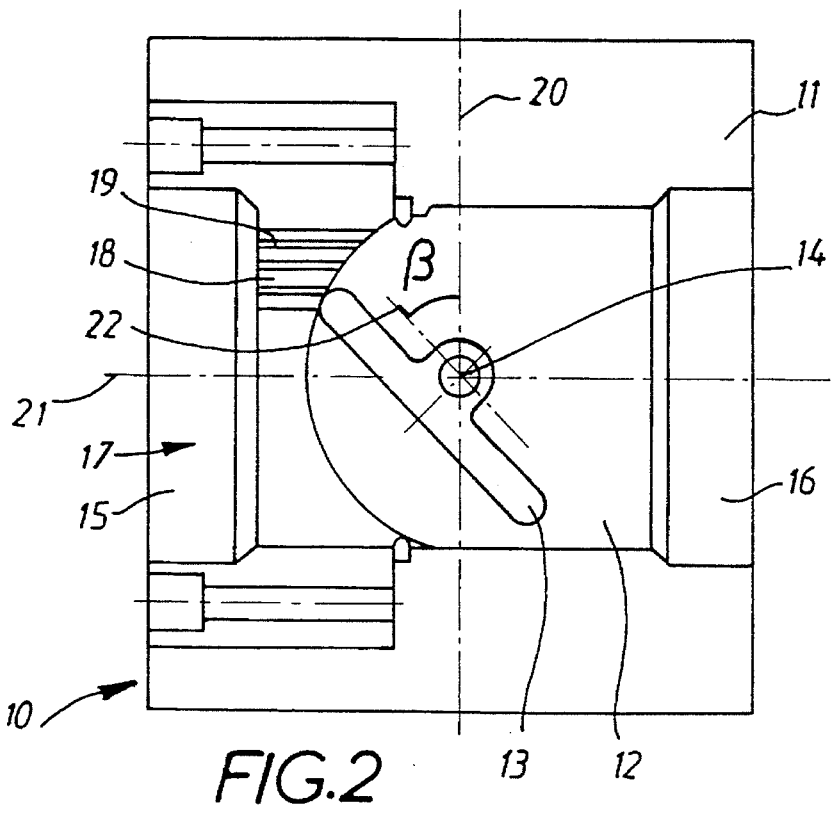
FIG. 2 is a cutaway view of the valve shown in FIG. 1, in the control position.
Figure 3:
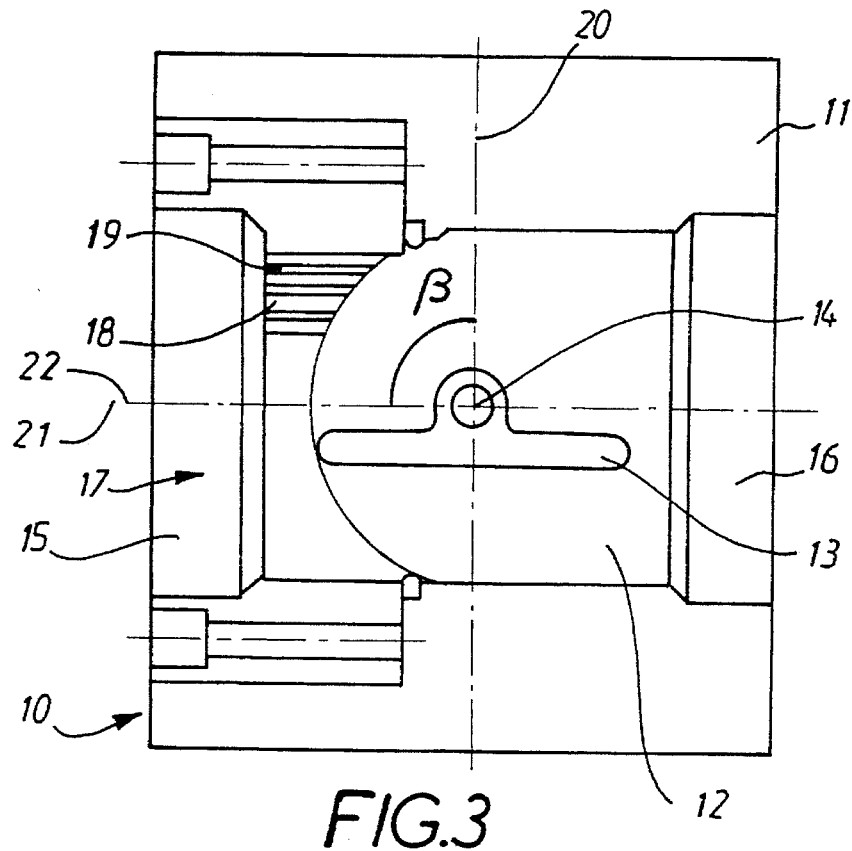
FIG. 3 is a cutaway view of the valve shown in FIG. 1, in the open position.

Referring to FIGS. 1 to 3, the valve 10 comprises a body 11 defining a housing 12 in which is provided a mobile plug 13 rotating about an axis of rotation 14. This housing 12 is extended on one side by an inlet channel 15, and on the other side by an outlet channel 16, respectively arranged to be connected to an inlet conduit and to an outlet conduit (not shown). The housing defines a connection passage 17 between the inlet channel and the outlet channel. The size of this passage can be adjusted between a zero value and a maximum value by making the mobile plug 13 rotate. The flow rate of a fluid flowing through the valve 10 can thus be controlled according to the angular position of the plug.

The valve is provided with a element which generates a drop in pressure 18 placed between the inlet channel 15 and the housing 12. This element comprises several cylindrical calibrated passages 19, arranged more or less parallel to the inlet channel. The diameter of these calibrated passages 19 is noticeably smaller than the diameter of the inlet channel 15 and the element generating a drop in pressure 18 is placed in the zone of the housing 12 through which the fluid first flows when one starts to open the valve.

In the embodiment illustrated by FIGS. 1 to 3, the plug 13 is in the shape of a disk. The housing is in the shape of a semi-sphere in the zone closest to the inlet channel 15, and the shape of a cylinder of the same diameter as the semi-sphere in the zone closest to the outlet channel 16. The plug 13 is positioned and sized so that it can tightly close the valve's connection passage.

FIG. 1 illustrates the valve 10 with the plug 13 in the closed position. In this position, the plug fully seals the connection passage 17 between the inlet channel 15 and the outlet channel 16. If the opening angle b is said to be the angle formed between an axis 20 which is perpendicular to the axis 21 of the inlet and outlet channel passing through the plug's axis of rotation 14 and parallel to the plug's 13 plane, the opening angle b is nil in the position shown by this figure.

FIG. 2 illustrates the valve 10 with the plug 13 in the control position. In this position, some of the fluid flowing through the valve passes through the calibrated passages 19 of the element which generates a drop in pressure 18 and some of it passes through the zone of the housing 12 located opposite the element which generates a drop in pressure. The opening angle b is between 0° and 90°. Altering this angle makes it possible to control the valve's flow rate.

FIG. 3 illustrates the valve 10 with the plug 13 in the open position. In this position, the plug offers the widest possible passage between the inlet channel and the outlet channel. The opening angle b is 90°.

Figure 4:
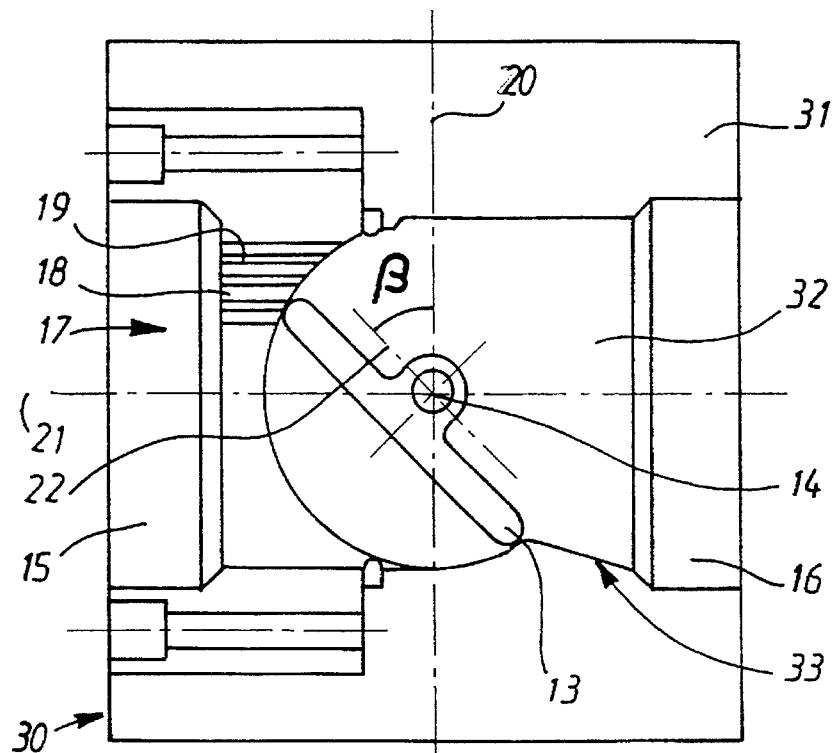
FIG. 4 is a cutaway view of a second embodiment of a valve according to the invention in a first control position corresponding to a small opening of the mobile plug.
Figure 5:
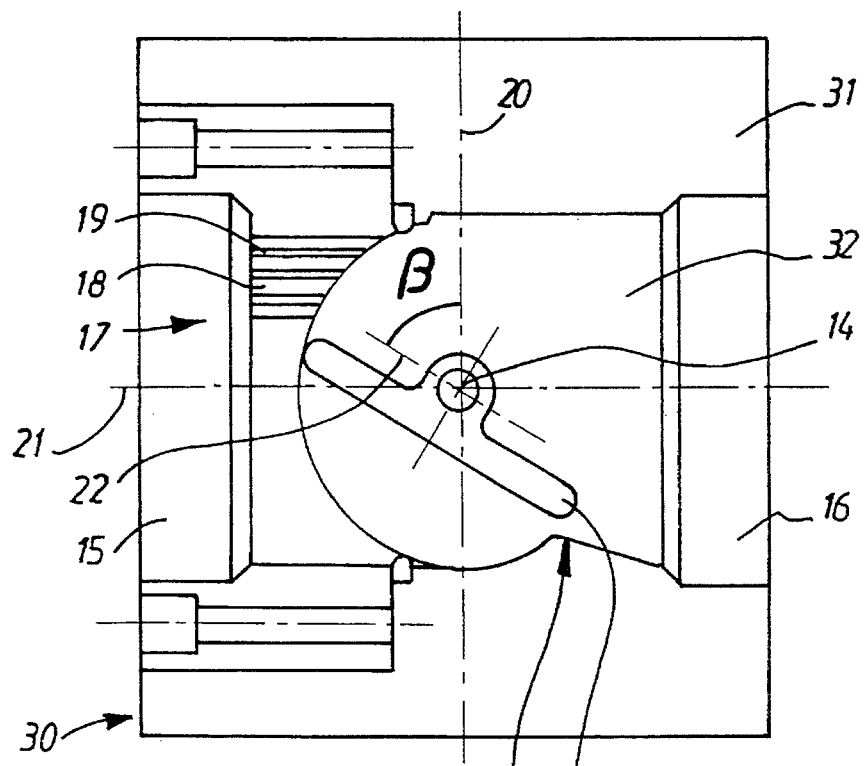
FIG. 5 is a cutaway view of the valve shown in FIG. 4 in a second control position corresponding to a wider opening of the mobile plug.

FIGS. 4 and 5 illustrate another embodiment of a valve 30 according to the invention. The components common to the embodiment illustrated by FIGS. 1 to 3 on the one hand and FIGS. 4 and 5 on the other hand, have the same reference numbers. The elements of this valve which differ from the valve 10 illustrated by FIGS. 1 to 3, are the body 31 and the housing 32. In this embodiment, the part of the housing 32 which is in the shape of a semi-sphere, is extended in its part located opposite the element which generates a drop in pressure 18, by an intermediate closing zone 33 which is in the shape of a portion of a sphere with the same diameter linked to the outlet channel by a truncated zone.

FIG. 4 illustrates the valve 30 in a first control position. In this position, the fluid can only enter the housing 32 and flow through the valve via the element which generates a drop in pressure 18. The intermediate closing zone 33 located at the rear of the housing 32 prevents the fluid from passing.

FIG. 5 illustrates the valve 30 in a second control position. The opening angle b is greater than in the previous figure and the fluid can flow through the valve on either side of the plug 13.

This embodiment offers the advantage of allowing particularly fine control with a low flow rate due to the fact that when the opening is small, the fluid can only flow through the valve by passing through the calibrated passages 19 of the element which generates a drop in pressure 18. In the next phase, the intermediate closing zone generates a second drop in pressure due to the necking between this zone and the corresponding edge of the mobile plug.

Figure 6:
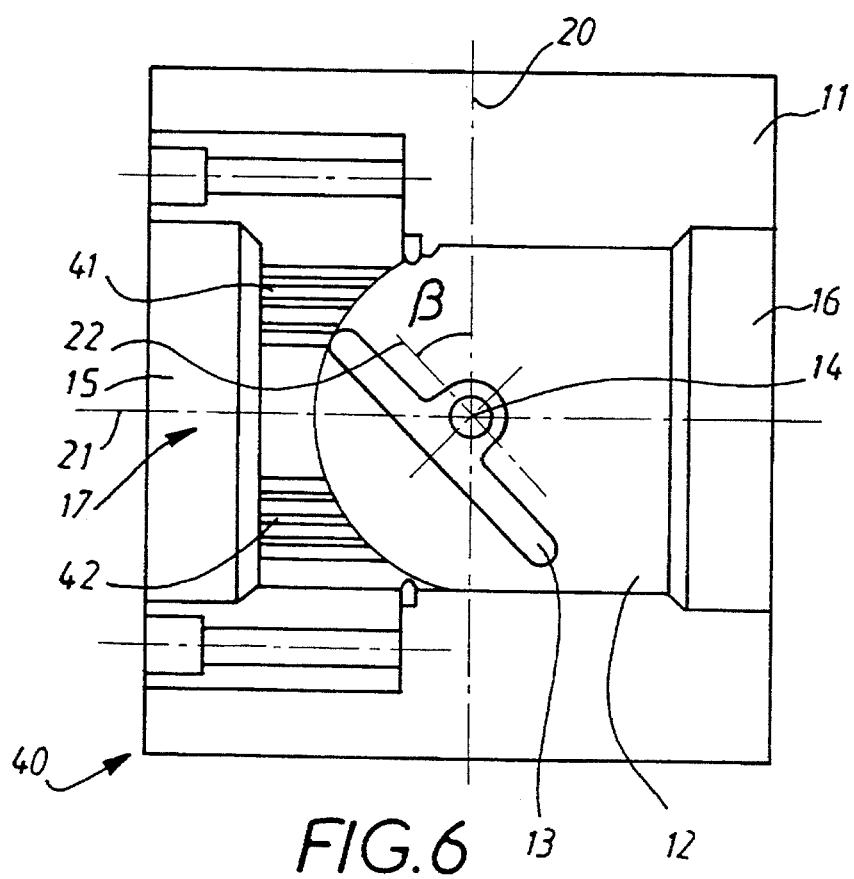
FIG. 6 is a cutaway view of a third embodiment of the valve according to the invention, in the control position.

FIG. 6 illustrates an alternative to the valve in FIGS. 1 to 3. As previously, the components common to the embodiments in FIGS. 1 to 3 and FIG. 6, have the same reference numbers. In this valve 40, the element which generates a drop in pressure 41 is made up of a ring which is provided with several calibrated passages 42 with a small diameter, arranged so as to provide a connection between the inlet channel 15 and the outlet channel 16.

Figure 7:
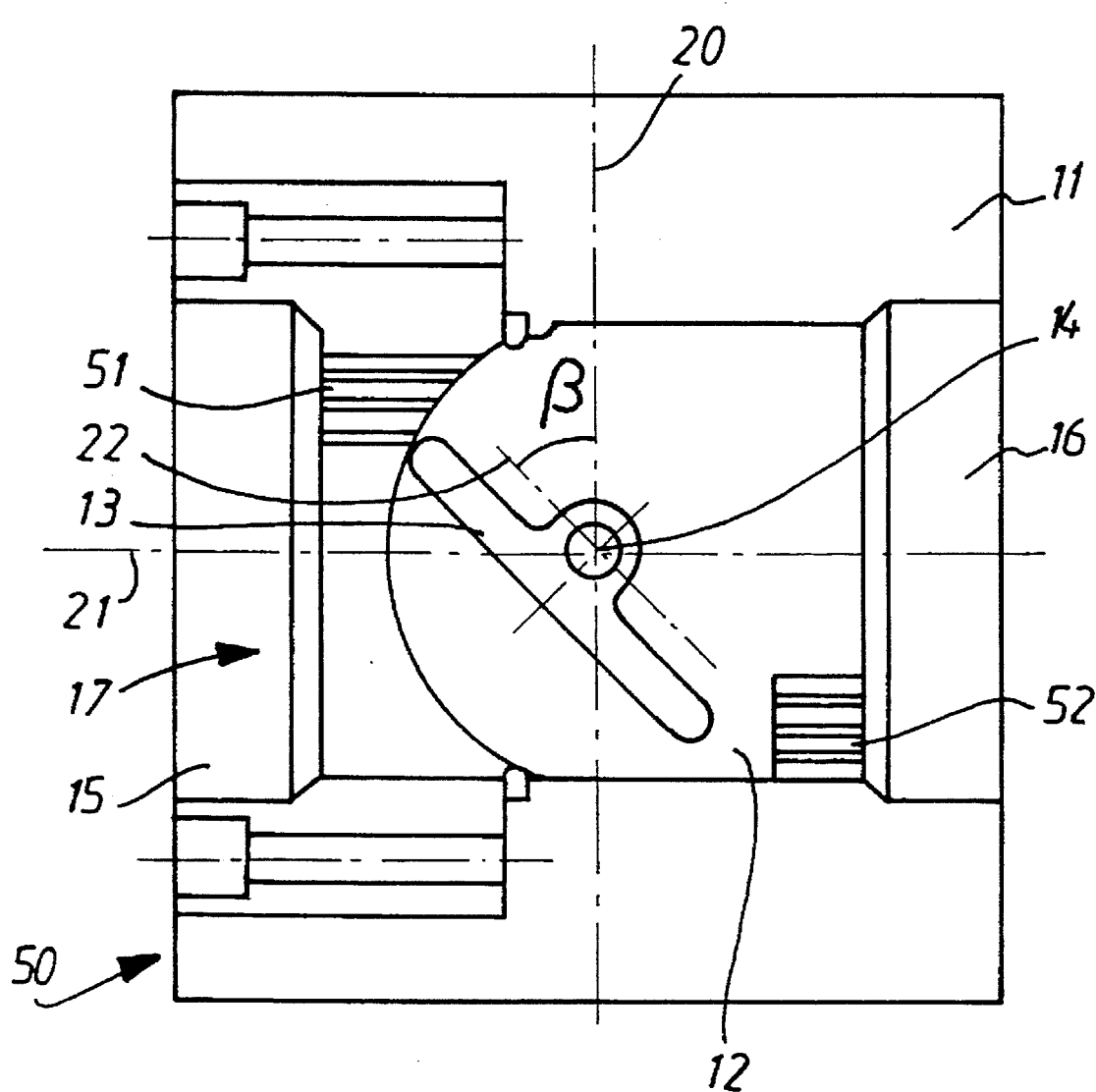
FIG. 7 is a cutaway view of a fourth embodiment of the valve according to the invention, in the control position.

FIG. 7 illustrates an embodiment of a valve 50 comprising two elements which generate a drop in pressure 51, 52. The first of these elements 51 is placed between the inlet channel 15 and the housing 12 and corresponds to the element 18 in FIGS. 1 to 3. The second element 52 is placed between the housing 12 and the outlet channel 16. This form of embodiment generates a back pressure on the plug 13 and balances the dynamic pressure on this plug. Furthermore, this valve 50 can be used to great advantage in a device in which the fluid can flow in both directions through the valve.

Figure 8:
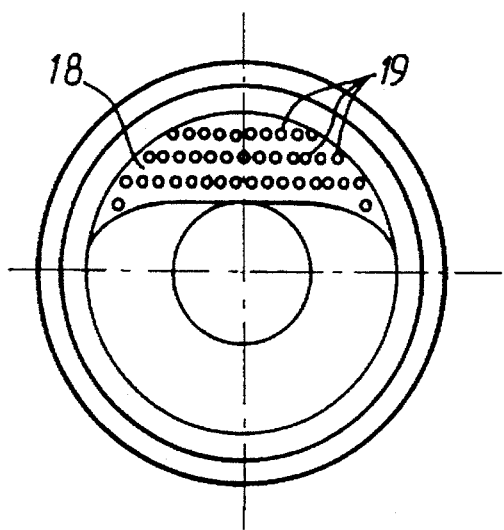
FIGS. 8 to 10 show various embodiments of the elements which generate a drop in pressure.
Figure 9:
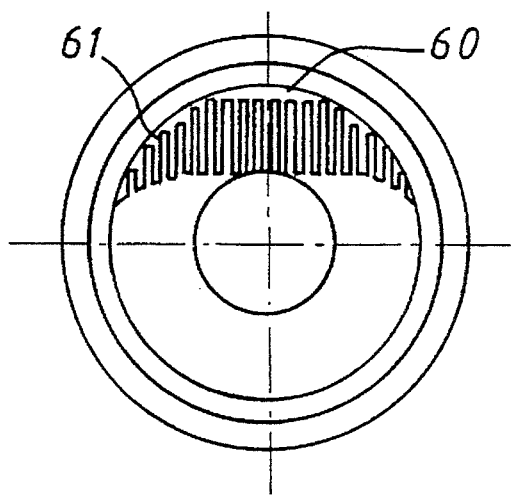
Figure 10:
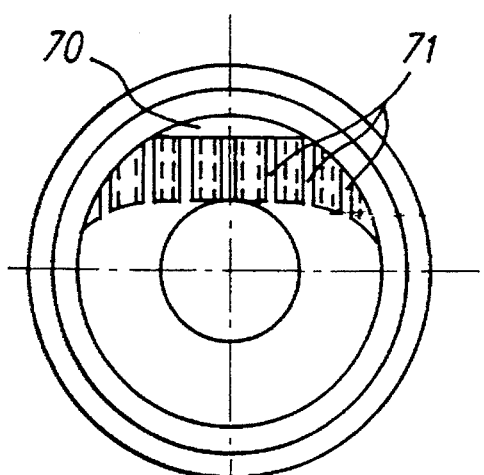

FIGS. 8 to 10 illustrate various alternative embodiments of the element which generates a drop in pressure as can be used in a valve like the one described above.

The element which generates a drop in pressure 18 illustrated by FIG. 8 is comprised of several calibrated passages 19 with a small diameter linking the inlet channel to the valve's housing. This embodiment is identical to the one illustrated by FIGS. 1 to 3.

The element which generates a drop in pressure 60 shown in FIG. 9 comprises a series of longitudinal slots 61 allowing the fluid to flow through the valve.

FIG. 10 shows an element which generates a drop in pressure 70 provided with several undulated grooves 71 linking the inlet channel to the valve's housing.

The shape, size and position of the openings in the element which generates a drop in pressure ensure a significant drop in pressure at the start of the opening. This drop in pressure makes it possible to do away with the phenomena of cavitation, noise and therefore the wear and tear of the valve's plug and housing.

Furthermore, this element which generates a drop in pressure modifies the curve of the pressure on the plug in such a way that it is more or less symmetrical in relation to its axis of rotation. This thus overcomes the problems related to rotating the plug and keeping it in position.

What is more, the size of the openings in the element which generates a drop in pressure enable particularly fine control when one starts to open the valve.

This invention is not restricted to the examples of embodiments described above, but can be widened to include any modifications which are obvious for the expert. The shape of the openings in the element which generates a drop in pressure linking the inlet channel to the valve's housing can be practically anything as long as these openings ensure a considerable drop in pressure when one starts to open the valve. The element which generates a drop in pressure can in particular be provided directly in the valve body or be attached to it.

The mobile plug's axis of rotation can furthermore be centered in relation to the housing or be horizontally or vertically offset. Offsetting the mobile plug's axis of rotation makes it possible to change the position of the static pressure on the plug. This can be an advantage when the static pressure on the plug has to be symmetrical in relation to its axis of rotation, which makes control easier.

This concept can also be used for centric, excentric or double eccentric plugs.

I claim:

1. A butterfly valve comprising:
a housing having an inlet and outlet, and a flow passage extending from said inlet to said outlet, and wherein a flow passage axis extends in a direction from said inlet to said outlet at a center of said flow passage;
a butterfly plug disposed in said housing between said inlet and said outlet, said butterfly plug movable about a pivot axis between a closed position and varying angular positions with respect to said closed position to thereby control flow through said flow passage, and wherein with respect to a plane passing through said pivot axis and parallel to said flow passage axis said plane separates said valve into first and second regions, and wherein said butterfly plug includes first and second peripheral portions with said first peripheral portion disposed in said first region when said butterfly plug is in said closed position and said second peripheral portion disposed in said second region when said butterfly plug is in said closed position;
an element generating a pressure drop, said element disposed at an inlet side of said housing with respect to said butterfly plug, said element also disposed in said first region;
said housing further including a closing zone disposed in said second region and at an outlet side of said housing with respect to said butterfly plug when said butterfly plug is in said closed position, said closing zone maintaining a closed relationship between said second peripheral portion of said butterfly plug and said housing during initial movement of said butterfly plug from said closed position such that during initial movement of said butterfly plug from said closed position flow only passes over said first peripheral portion of said butterfly plug in said first region and flow does not pass over said butterfly plug in said second region, and during initial opening flow passes through said element prior to passing over said first peripheral portion of said butterfly plug.

2. The butterfly valve of claim 1, wherein said butterfly plug is disk shaped, said closing zone is a continuous surface which is a sector of a sphere having a radius equal in size to a radius of said butterfly plug, wherein said surface which is a sector of a sphere is disposed on an outlet side of said housing with respect to said butterfly plug when said butterfly plug is in said closed position.

3. The butterfly valve of claim 1, wherein said element includes a plurality of apertures extending therethrough.

4. The butterfly valve of claim 3, wherein said element includes a surface on a downstream side thereof which is a sector of a sphere.

5. The butterfly valve of claim 1, wherein said element includes a plurality of cylindrical passages.

6. The butterfly valve of claim 1, wherein said element includes a plurality of slots.

7. The butterfly valve of claim 1, wherein said element includes a plurality of undulated grooves.

8. The butterfly valve of claim 1, wherein with respect to a cross-section along a plane perpendicular to said pivot axis said element includes an arcuate side facing toward said butterfly plug.

9. A butterfly valve comprising:
a housing having an inlet and an outlet, and a flow passage extending therethrough;
a disk closure member disposed between said inlet and said outlet, said disk closure member movable about a pivot axis to control flow through said flow passage, and wherein in a closed position said disk closure member extends parallel to a first plane, and wherein with respect to a second plane perpendicular to said first plane and parallel to said pivot axis, said valve includes a first region on a first side of said second plane and a second region on a second side of said second plane with said second plane between said first region and said second region;
an element generating a pressure drop, said element disposed at an inlet side of said disk closure member when said disk closure member is in said closed position, said element also disposed in said first region;
said housing including a continuous spherical sector surface disposed on an outlet side of said disk closure member when said disk closure member is in said closed position, said continuous spherical sector surface disposed in said second region.

10. The butterfly valve of claim 9, wherein with respect to a cross-section along a third plane perpendicular to said first and second planes, said element includes an arcuate side facing toward said disk closure member.

11. The butterfly valve of claim 9, wherein said continuous spherical sector surface has a radius equal to a radius of said disk closure member, and wherein during initial movement of said disk closure member from said closed position flow passes over said disk closure member only in said first region.

12. The butterfly valve of claim 9, wherein said element includes a plurality of apertures.

13. The butterfly valve of claim 9, wherein said element includes a plurality of cylindrical openings extending in a direction parallel to said second plane.

14. The butterfly valve of claim 9, wherein said element includes a plurality of slots.

15. The butterfly valve of claim 9, wherein said element includes a plurality of undulated grooves.

* * * * *